G. A. Hankinson,
Nose Bag,
No. 37,914.      Patented Mar. 17, 1863.

UNITED STATES PATENT OFFICE.

GUSTAVUS A. HANKINSON, OF MANAHOCKING, NEW JERSEY.

IMPROVED AUTOMATIC NOSE-BAG.

Specification forming part of Letters Patent No. 37,914, dated March 17, 1863.

*To all whom it may concern:*

Be it known that I, GUSTAVUS A. HANKINSON, M. D., of Manahocking, in the county of Ocean and State of New Jersey, have invented a certain new and useful Improvement in Nose-Bags for Horses, which I denominate an "Automatic Nose-Bag," of which the following is a full, clear, and exact description, reference being had to the accompanying drawings, which make part of this specification, in which—

Figure 1:
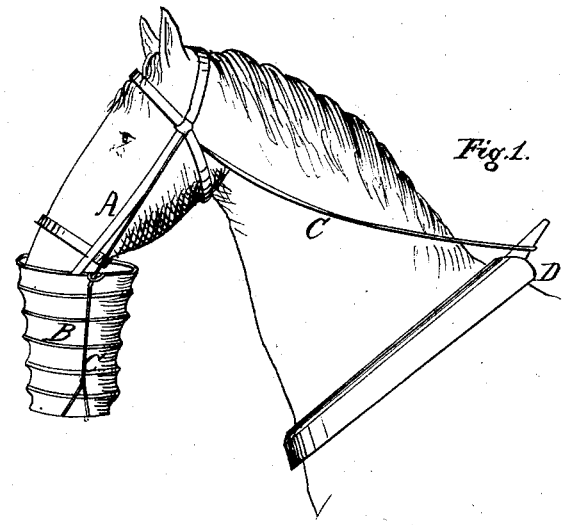
Figure 2:
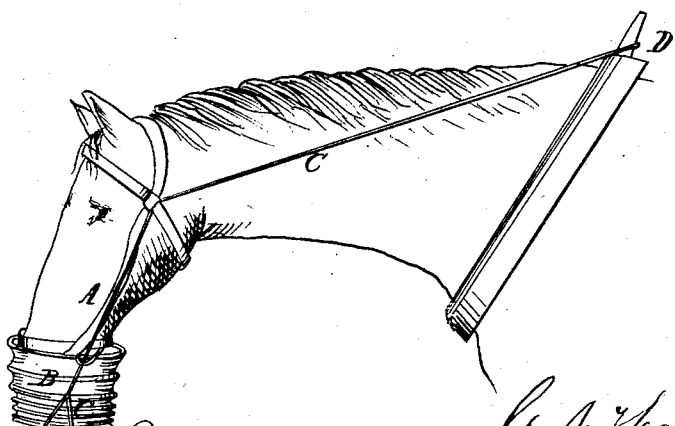

Figure 1 represents a view of my improved automatic nose-bag as it appears when the horse has taken a mouthful of food from the bag and is chewing it, and Fig. 2, a view of the same in the position it assumes when the horse lowers his head to take a mouthful from the bag.

The ordinary nose-bag heretofore employed consists simply of a bag suspended from the horse's head, with the bottom in a fixed position relatively thereto. This is inconvenient, as the bag must be made nearly to cover the horse's eyes, in which case his breath stirs up the dust in the grain and fills his eyes and nostrils with it, or else he must lower his head till the bag touches the ground in order to get at the food in its bottom, in which case the bag is apt to be upset and the food wasted. To avoid these difficulties it has been proposed to support the bag in a fixed position, either by a foot resting on the ground or by attaching poles to the shafts when used, or to the body of the horse by straps. This device is awkward, clumsy, and cumbersome, and involves too much mechanism for transportation to answer the purposes of an army, where such a device is principally used.

It is the object of my invention to attain the advantages of previously existing devices while avoiding their defects, and to these ends my improvement consists in suspending a nose-bag from the head of the horse in such manner that when he lowers his head to take a bite the bottom of the bag will be drawn up toward his mouth to enable him readily to reach the food, and when he raises his head the bottom of the bag will be lowered to its former position and leave his head clear, or very nearly so, of the bag.

In the accompanying drawings, a nose-bag embracing my improvement is shown as suspended from the horse's head by means of the cheek-pieces A of the halter. The bag B, in this instance, consists of a series of rings or hoops, arranged one above the other and secured to the material of which the bag is made in any suitable manner, in order to keep the bag distended. A cord or rim, C, attached to each side of the bag, at or near its bottom, passes through a ring or loop near the top of the bag and then through a ring or loop near the brow-band. These reins are then carried back and secured on the hames or collar D. In case the horse is in harness the reins may be likewise secured to the pommel of a saddle or to a strap or rope secured around the horse's body or withers.

The operation of the device will readily be understood by referring to the drawings, in which Fig. 1 shows the position of the bag when the horse's head is raised. When he lowers his head the distance between the point of attachment D of the reins and the bottom of the bag is increased and the bottom of the bag is consequently drawn up, as shown in Fig. 2.

It is obvious that the details of the above-described arrangement might be varied in different ways without departing from the spirit of my invention. For instance, the bag might be suspended from the horse's head without any connection with the bridle or halter, or it might be connected to either. I do not, therefore, limit myself to the precise arrangement shown; but

What I claim as my invention, and desire to secure by Letters Patent, is—

Suspending the nose-bag in such manner that the natural movements of the horse in feeding will cause the bottom of the bag to approach or recede from his mouth, substantially as described.

In testimony whereof I have hereunto subscribed my name.

G. A. HANKINSON.

Witnesses:
ISAIAH B. CRAMMER,
JARVIS H. BROWN.